United States Patent [19]

Aquilina

[11] Patent Number: 4,720,206
[45] Date of Patent: Jan. 19, 1988

[54] TOOL HANDLE FASTENING CLIP

[75] Inventor: Paul C. Aquilina, Kitchener, Canada

[73] Assignee: Melnor Manufacturing Ltd., Brantford, Canada

[21] Appl. No.: 870,902

[22] Filed: Jun. 5, 1986

[30] Foreign Application Priority Data

May 30, 1986 [CA] Canada ................................. 510529

[51] Int. Cl.$^4$ ............................ B25G 3/02; F16D 1/00
[52] U.S. Cl. ..................................... 403/361; 403/366; 403/321; 279/29
[58] Field of Search ............... 403/366, 361, 321, 322, 403/356, 397, 283; 279/29

[56] References Cited

U.S. PATENT DOCUMENTS

| 845,156 | 2/1907 | Winchester | 403/283 X |
|---------|--------|------------|-----------|
| 2,159,446 | 5/1939 | Murphy | 403/361 |
| 2,180,929 | 11/1939 | Murphy | 403/361 X |
| 2,225,594 | 12/1940 | Murphy | 403/361 |
| 3,177,024 | 4/1965 | Krook et al. | 403/329 X |
| 4,224,786 | 9/1980 | Langlie et al. | 403/361 X |

*Primary Examiner*—Andrew V. Kundrat
*Attorney, Agent, or Firm*—R. Craig Armstrong

[57] ABSTRACT 44A clip for securing a handle shaft in a shaft-receiving opening in a tool is disclosed. The clip comprises a central portion and a tab portion integral with the central portion to project through a radially-directed slot in the structural portion of the tool which surrounds the shaft-receiving opening. One or the other of the central portion or the tab portion is configured for positioning on the interior of the structural portion of the tool which surrounds the shaft-receiving opening, and the other on the exterior. A flange depends from the central portion. The flange has an elongated aperture through which the handle shaft passes. The edge of the aperture remote from the central portion, preferably provided with teeth, is angled and biased towards the handle shaft to anchor it. Instead of the apertured flange, a tongue depending from the central portion and angled and biased towards the handle shaft may be used. The interior one of the central portion and the tab portion preferably includes at least one axially disposed ramp of narrow thickness, each ramp increasing in height in the direction of insertion of the handle shaft. Each ramp may have a radially disposed end face for anchoring into the handle shaft. Preferably, there are two ramps, angling in towards each other as their height increases.

11 Claims, 7 Drawing Figures

TOOL HANDLE FASTENING CLIP

BACKGROUND OF THE INVENTION

This invention relates to a clip useful for connecting a handle shaft to a tool, as for example a wooden handle shaft to a snow shovel.

In the case of a snow shovel, it is common to have a cylindrical wooden handle shaft, usually tapered at the end, for insertion into an essentialy cylindrical and usually tapered opening in the shovel.

The tool portion typically has a cylindrical or tapered opening for receiving the end of the handle shaft. The handle shaft typically is cylindrical or tapered, to match the shape of the opening. Once the end of the handle shaft is in position in the opening, the handle shaft is somehow fastened to the tool. Usually, this fastening is accomplished by such means as driving a screw, nail, staple or rivet through that portion of the tool which surrounds the opening, into the handle shaft.

One disadvantage of the conventional type of connection is that it usually must be done at the factory. Shipping snow-shovels with the handle shafts already attached is quite inefficient, because the shovels cannot be packaged and boxed in any efficient fashion. The shovels are also somewhat more prone to minor damage prior to delivery to the customer, because of the handling and packaging problems. It would thus be very useful to have a design which would facilitate the handle shaft being attached to the shovel after shipment, whether at the retail outlet or by the consumer himself or herself after purchasing the shovel.

It should be clearly understood that this invention is in no way limited to snow shovels, but is applicable to other tools to which a handle shaft must be attached. Where an extremely rigid connection is required, such as in the case of a hammer or an ax, use of the present invention would not be appropriate, but otherwise there is a large range of tools with which the invention could be used, including, for example, lawn and garden tools.

SUMMARY OF THE INVENTION

It is an object of the present invention to provide an inexpensive, effective, and simple means for fastening a handle to a tool.

Thus in accordance with the invention there is provided a clip for securing a handle shaft in a shaft-receiving opening in a tool. The clip comprises a central portion for positioning on the structural portion of the tool which surrounds the shaft-receiving opening, and a tab portion integral with the central portion, which projects through a radially-directed slot in the structural portion of the tool which surrounds the shaft-receiving opening. Either the central portion or the tab portion is configured for positioning on the interior of the structural portion of the tool which surrounds the shaft-receiving opening, and the other on the exterior. Thus by virtue of the tab portion passing through the radially-directed slot, and by virtue of the interior one of the central portion and the tab portion being jammed within the shaft-receiving opening when the handle shaft is inserted, the clip is secured against axial movement in the tool. Shaft-engaging means integral with the central portion extend therefrom towards the shaft-receiving opening so as to present to an installed handle shaft at least one edge angled and biased towards the handle shaft generally in the direction of insertion.

In a first preferred embodiment, the shaft-engaging means comprises a flange depending from the central portion, the flange having an elongated aperture through which the handle shaft passes. The edge of said aperture remote from the central portion is positioned to be angled and biased towards the handle shaft generally in the direction of insertion, to engage the handle shaft to thereby resist withdrawal. The biasing is effected by virtue of the resting position of the flange being such that the aperture edge is positioned to interfere with the insertion of the handle shaft, requiring that the flange be flexed and deformed during insertion of the handle shaft. The edge may be provided with teeth for improved anchoring.

In an alternative preferred embodiment, the shaft-engaging means comprises a tongue depending from the central portion generally in the direction of insertion of the handle shaft for engaging the handle shaft. The biasing is effected by virtue of the resting position of the tongue being such that it interferes with the insertion of the handle shaft, requiring that the tongue be flexed and deformed during insertion of the handle shaft.

In accordance with another feature of the invention, the interior one of the central portion and the tab portion may include at least one axially disposed ramp of narrow thickness, each ramp increasing in height in the direction of insertion of the handle shaft. Each ramp may have a radially disposed end face for anchoring into the handle shaft. In the preferred embodiments, there are two ramps, angling in towards each other a their height increases.

BRIEF DESCRIPTION OF THE DRAWINGS

The preferred embodiments of the invention will now be described in detail with reference to the accompanying drawings, in which.

DETAILED DESCRIPTION OF THE PREFERRED EMBODIMENTS

Figure 1:
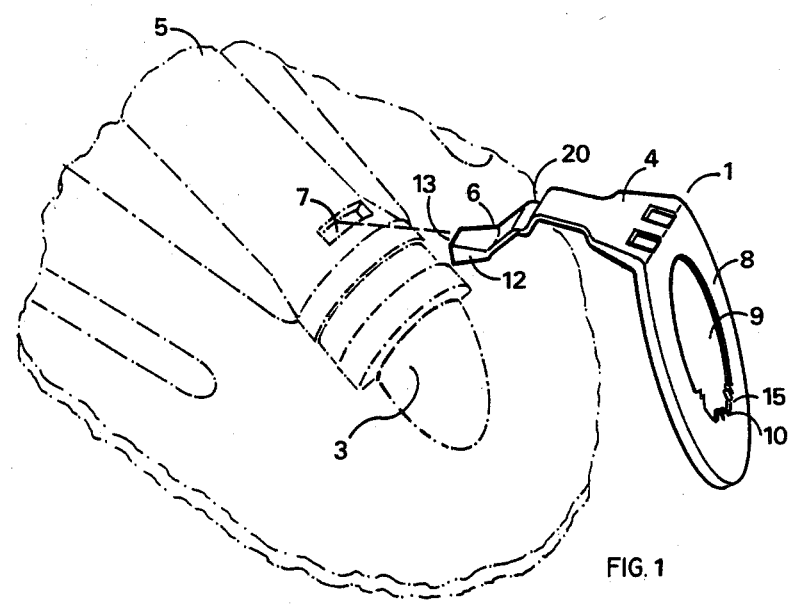
FIG. 1 is a perspective showing a first preferred embodiment of the clip, with the shaft-receiving portion of a tool ghosted in to illustrate a typical installation location.
Figure 2:
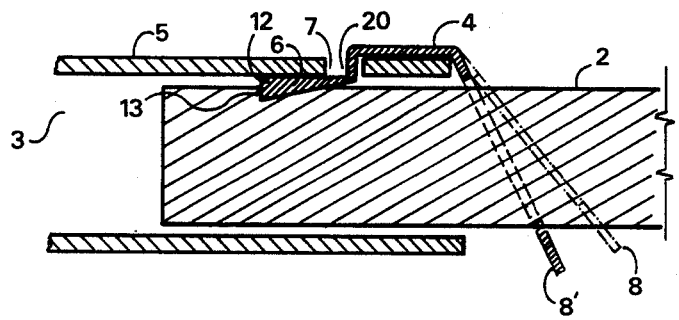
FIG. 2 is a side view of the clip as installed on a handle shaft and tool.
Figure 3:
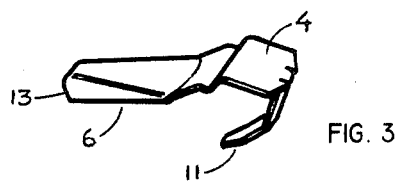
FIG. 3 is a perspective of an alternative embodiment of the clip.
Figure 4:
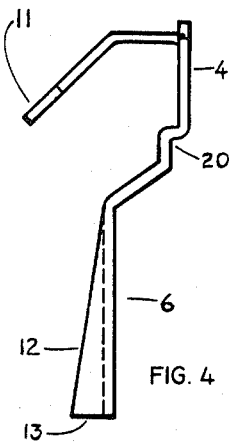
FIG. 4 is a side view of the alternative embodiment.
Figure 5:
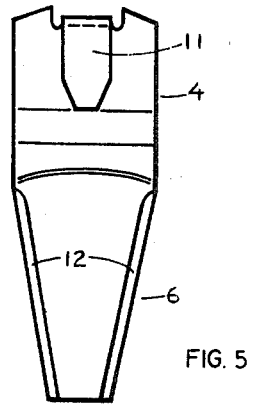
FIG. 5 is a plan view of the alternative embodiment.
Figure 6:
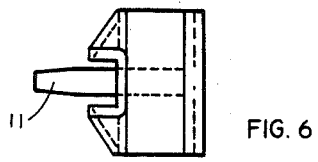
FIG. 6 is an end view of the alternative embodiment.

Referring first to FIGS. 1 and 2, there is illustrated the clip 1 of the first preferred embodiment, intended to secure a handle shaft 2 in a shaft-receiving opening 3 in a tool.

The clip comprises a central portion 4 for positioning on the structural portion 5 which surrounds the shaft-receiving opening 3 in the tool. A tab portion 6 integral with the central portion 4 is configured to project through a radially-directed slot 7 in the structural portion 5. The tab portion 6 has an L-shaped jog 20 of a depth corresponding to the thickness of the structural portion 5, so that the central portion 4 lies more or less flat against the structural portion 5 when the clip is installed with the tab portion 6 projecting through the slot 7. Thus, by virtue of the tab portion 6 passing through the radially-directed slot 7, and by virtue of the tab portion 6 being jammed within the shaft-receiving opening 3 when the handle shaft 2 is inserted, the clip 1 is secured against axial movement with respect to the tool.

The tab portion 6 includes two axially disposed ramps 12 of narrow thickness. These ramps 12 increase in height in the direction of insertion of the handle shaft 2, so that they are forced into the handle shaft 2 as it is inserted. Each ramp has a radially disposed end face 13 whereby withdrawal of the handle shaft is resisted by the action of that end face 13 anchoring in the handle shaft 2. Preferably, the ramps 12 angle in towards each other as their height increases, since this improves the anchoring action by allowing the wood or other deformable handle shaft material to flow around the ramps 12, rather than having the ramps 12 cut elongated grooves. The ramps 12 also serve to prevent rotation of the handle shaft 2.

It will be appreciated that substantially the same effect could be achieved with only one ramp 12, but two ramps is obviously preferable to one ramp. Also, more than two ramps could be used, although there is little to be gained by doing so.

Shaft-engaging means integral with the central portion 4 extend therefrom generally in the direction opposite the direction of insertion of the handle shaft 2, i.e. generally away from the tool, and are so arranged as to present to the installed handle shaft 2 at least one edge angled and biased towards the handle shaft in the direction of insertion for digging into the handle shaft to thereby resist movement of the handle shaft in the opposite direction.

In the first preferred embodiment, the shaft-engaging means comprises a flange 8 depending at an angle from the central portion 4. The flange 8 has an elongated aperture 9 positiond so as to roughly align with the shaft-receiving opening 3. The aperture 9 is configured such that the edge 15 of the aperture remote from the central portion is biased towards the handle shaft. The biasing is effected by virtue of the resting position of the flange 8 being such that the edge 15 is positioned to interfere with the insertion of the handle shaft, requiring that the flange be flexed and deformed during insertion of the handle shaft. The edge 15 is preferably provided with teeth 10 for anchoring into the handle shaft 2. The teeth 10 may provide more positive anchoring of the handle shaft 2, both against withdrawal and rotation, but it should be stressed that they are optional, since the edge 15 of the aperture itself acts to anchor the handle shaft 2 quite securely.

Referring now to FIGS. 3 to 6, a second preferred embodiment is illustrated. In this embodiment, the shaft-engaging means comprises a tongue 11 depending downwardly from the central portion 4 and angling generally in the direction of insertion of the handle shaft 2. The tongue 11 is biased towards the handle shaft, by virtue of its resting position being such that it interferes with the insertion of the handle shaft, requiring that it be flexed and deformed during insertion of the handle shaft. The tongue 11 digs into the handle shaft 2 when an attempt is made to withdraw the handle shaft, and the tongue may be pointed if desired.

In both embodiments of the invention, the angle of the shaft-engaging means is not critical, i.e. the angle of the flange 8 from the central portion 4 in the first embodiment, and the angle of the tongue 11 from the central member 4 in the second embodiment. Any angle roughly in the range of 20 to 70 degrees from the axis of the handle shaft 2 would be acceptable, the angle being present to improve the anchoring action, so that attempting to remove the handle shaft involves working against the effect of the angle, tending to bend the flange 8 or tongue 11, and tending to force the edge 15 and teeth 10, or tongue 11 as the case may be, into the handle shaft 2.

In the case of the first embodiment, it should be appreciated that a similar effect could be achieved without angling the flange at all, i.e. arranging the flange at a right angle to the axis of the handle shaft 2, if the teeth 10 were angled to dig into the handle shaft 2.

Figure 7:
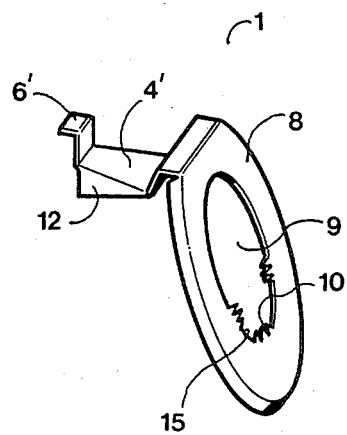
FIG. 7 is a perspective of another alternative embodiment, in which the central portion of the cilp is for positioning on the interior of the shaft-receiving opening.

In both embodiments illustrated in this specification, the tab portion 6 is configured for positioning on the interior of the structural portion 5, with the central portion 4 being on the exterior. Thus, by virtue of the tab portion 6 passing through the radially-directed slot 7, and by virtue of the tab portion being jamed within the shaft-receiving opening 3 when the handle shaft 2 is inserted, the clip 1 is secured against axial movement with respect to the tool. However, it should be appreciated that the same effect could be achieved by having the central portion configured for positioning on the interior of the structural portion 5, with the tab portion being on the exterior. This is illustrated in FIG. 7. Then, by virtue of the tab portion 6 passing through the radially-directed slot 7, and by virtue of the central portion 4 being jammed within the shaft-receiving opening 3 when the handle shaft 2 is inserted, the clip 1 is still secured against axial movement with respect to the tool. Ramps 12 could be provided as folded-down tabs from the central portion. The shaft-engaging means would remain essentially unchanged.

It will be appreciated that the structures described above could be varied considerably within the broad scope of the invention. Obvious variations on the structures described above are considered to be within the scope of the invention defined by the following claims, whether or not expressly referred to above.

What is claimed as the invention is:

1. In combination, a tool, a handle, and a clip for securing the shaft of said handle in a shaft-receiving opening in said tool, said clip comprising:

a central portion for positioning on the structural portion of the tool which surrounds said shaft-receiving opening;

a tab portion integral with said central portion, configured for projecting through a radially-directed slot in said structural portion of the tool which surrounds said shaft-receiving opening; one of said central portion and said tab portion being configured for positioning on the interior of said structural portion of the tool which surrounds said shaft-receiving opening, and the other on the exterior, whereby by virtue of said tab portion passing through said radially-directed slot, and by virtue of the interior one of said central portion and said tab portion being jammed within said shaft-receiving opening when the handle shaft is inserted, said slip is secured against axial movement in said tool; and shaft-engaging means integral with said central portion, extending therefrom towards the shaft-receiving opening so as to present to a handle shaft installed in said shaft-receiving opening at least one edge angled and biased towards said handle shaft generally in the direction of insertion of said handle shaft for engaging said handle shaft to thereby resist withdrawal of said handle shaft.

2. The combination as recited in claim 1, in which said shaft-engaging means comprises a flange depending from said central portion, said flange having an elongated aperture for passage of the handle shaft, the edge of said aperture remote from said central portion being positioned to be angled and biased towards said handle shaft generally in the direction of insertion of said handle shaft for engaging said handle shaft to thereby resist withdrawal of said handle shaft, said biasing being effected by virtue of the resting position of said flange being such that said aperture edge is positioned to interefere with the insertion of the handle shaft, requiring that the flange be flexed and deformed during insertion of the handle shaft.

3. The combination as recited in claim 1, in which said shaft-engaging means comprises a tongue depending from said central portion generally in the direction of insertion of said handle shaft for engaging said handle shaft to thereby resist withdrawal of said handle shaft, said tongue at its end presenting an edge for engaging said handle shaft, said biasing being effect by virtue of the resting position of said tongue being such that it interferes with the inesertion of the handle shaft, requiring that the tongue be flexed and deformed during insertion of the handle shaft.

4. A clip for securing a handle shaft in a shaft-receiving opening in a tool, comprising:
- a central portion for positioning on the structural portion of the tool which surrounds said shaft-receiving opening;
- a tab portion integral with said central portion, configured for projecting through a radially-directed slot in said structural portion of the tool which surrounds said shaft-receiving opening; one of said central portion and said tab portion being configured for positioning on the interior of said structural portion of the tool which surrounds said shaft-receiving opening, and the other on the exterior, whereby said tab portion passing through said radially-directed slot, and the interior one of said central portion and said tab portion being jammed within said shaft-receiving opening when the handle shaft is inserted, secures said clip against axial movement in said tool, where the interior one of said central portion and said tab portion includes at least one axially disposed ramp of narrow thickness, each said ramp increasing in height in the direction of insertion of said handle shaft, for forcing into said handle shaft, each said ramp having a radially disposed end face whereby withdrawal of said handle shaft is resisted by the action of said end face anchored in said handle shaft; and
- shaft-engaging means integral with said central portion, extending therefrom towards the shaft-receiving opening so as to present to a handle shaft installed in said shaft-receiving opening at least one edge angled and biased towards said handle shaft generally in the direction of insertion of said handle shaft for engaging said handle shaft to thereby resist withdrawal of said handle shaft.

5. A clip as recited in claim 4, in which said shaft-engaging means comprises a flange depending from said central portion, said flange having an elongated aperture for passage of the handle shaft, the edge of said aperture remote from said central portion being positioned to be angled and biased towards said handle shaft generally in the direction of insertion of said handle shaft for engaging said handle shaft to thereby resist wtihdrawal of said handle shaft, said biasing being effected by virtue of the resting position of said flange being such that said aperture edge is positioned to interfere with the insertion of the handle shaft, requiring that the flange be flexed and deformed during insertion of the handle shaft.

6. A clip as recited in claim 5 in which said aperture edge remote from said central portion is provided with at least one tooth for anchoring into said handle shaft.

7. A clip as recited in claim 4, in which said shaft-engaging means comprises a tongue integral with and depending from said central portion generally in the direction of insertion of said handle shaft for engaging said handle shaft and resisting withdrawl of said handle shaft, said tongue at its end presenting an edge angled and biased towards said handle shaft, said biasing being effected by virtue of the resting position of said tongue being such that it intereferes with the insertion of the handle shaft, requiring that the tongue be flexed and deformed during insertion of the handle shaft.

8. A clip as recited in claim 4, in which there are two ramps, angling in towards each other as their height increases.

9. A clip as recited in claim 5, in which there are two ramps, angling in towards each other as their height increases.

10. A clip as recited in claim 6, in which there are two ramps, angling in towards each other as their height increases.

11. A clip as recited in claim 7, in which there are two ramps, angling in towards each other as their height increases.

* * * * *